Jan. 5, 1937. T. F. BAILY 2,066,665
PROCESS FOR THE TREATMENT OF ORES CONTAINING IRON
Filed July 18, 1934 3 Sheets-Sheet 3

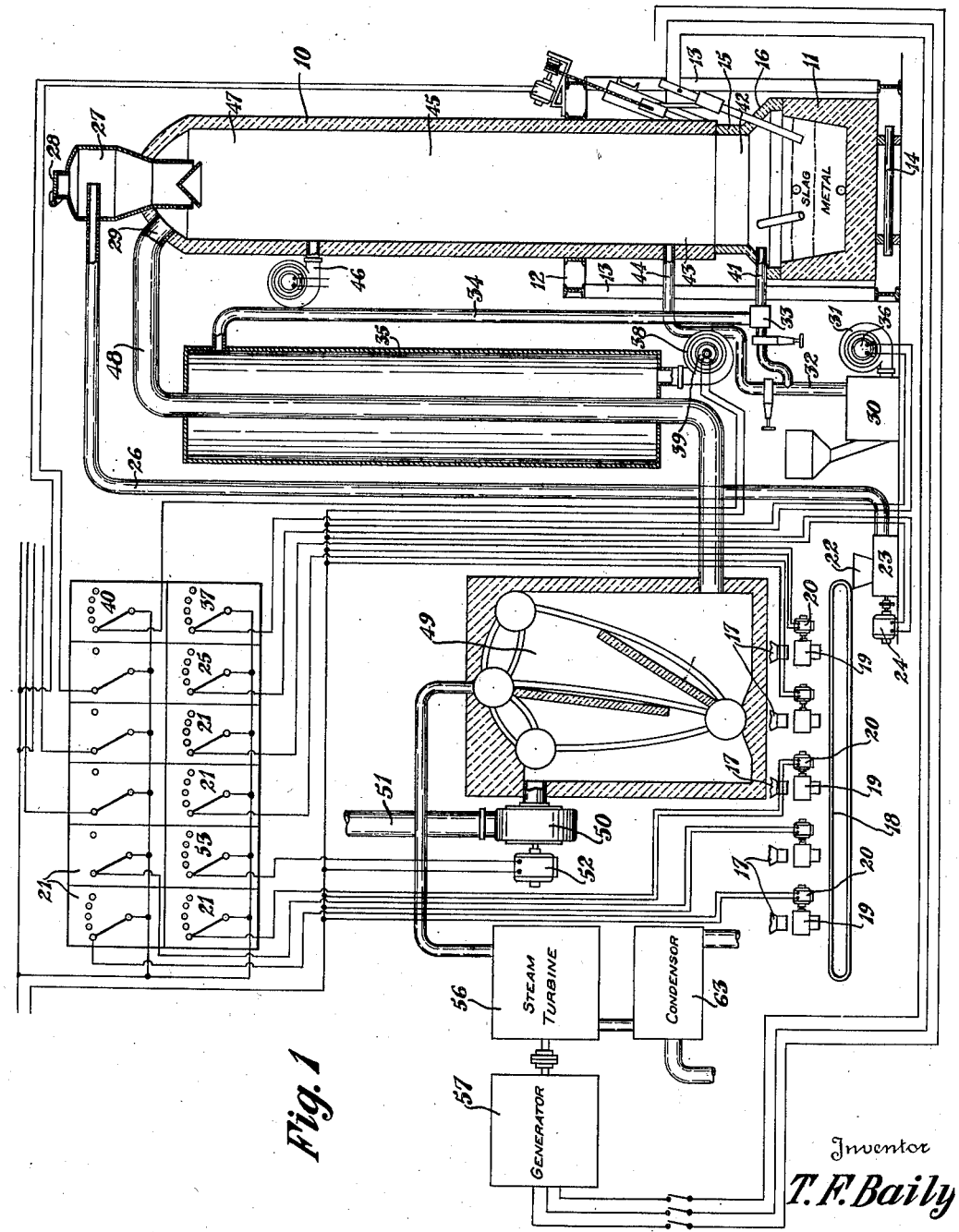

Inventor
T. F. Baily

Patented Jan. 5, 1937

2,066,665

UNITED STATES PATENT OFFICE 2,066,665

PROCESS FOR THE TREATMENT OF ORES CONTAINING IRON

Thaddeus F. Baily, Canton, Ohio

Application July 18, 1934, Serial No. 735,811

19 Claims. (Cl. 75—11)

This invention relates to a process for the reduction of ores containing iron, or oxides utilized as ores, which are finely pulverized and allowed to descend through a suitable furnace shaft counterflow to ascending gases which may be produced by the incomplete combustion of fuel with preheated air in a combustion chamber located at the bottom of the furnace shaft, or in a gas producer outside of the furnace.

The object of the improvement is to provide means for producing ferro-alloys, pig iron, steel, and commercially pure iron low in metalloids, by reducing finely divided ores or oxides utilized as ores, especially ores containing sulphur and phosphorus, in the shaft section of the furnace, and for melting or superheating the reduced material together with slag making, alloying or deoxidizing materials, and reducing any refractory oxides required, such as silicon, manganese, or chromium, in a hearth section located directly beneath the shaft section of the furnace, and the present invention is an improvement over my United States Letters Patent No. 1,775,713, and may be carried out in an apparatus such as is disclosed in my copending application for Reduction and melting apparatus Serial No. 730,382, filed June 13, 1934.

Figures 2, 3:
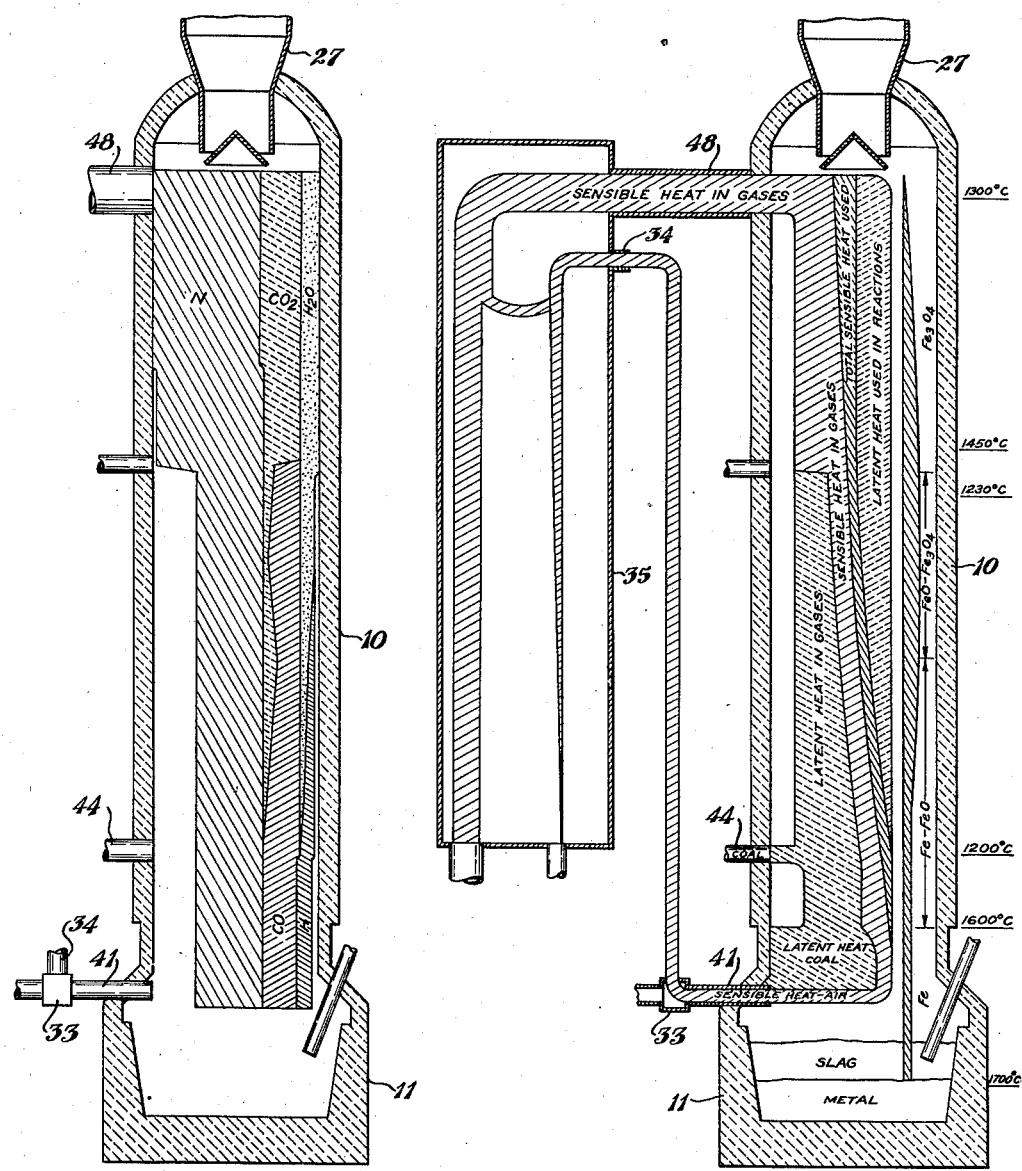

The above, together with other objects which will be apparent from an inspection of the accompanying drawings and the following detail description, or which may be later pointed out, may be attained as hereinafter described and as illustrated in the accompanying drawings, in which Figure 1 is a more or less diagrammatic vertical sectional view through a furnace and apparatus for carrying out the improved reduction process to which the invention pertains;

Fig. 2, a diagrammatic view of the furnace and recuperator showing the heat distribution;

Fig. 3 is a diagram of the example cited in the specification showing the distribution of the gases in the furnace according to volume, and indicates where the reduction of the iron oxide takes place by showing the variations in the ratio of CO to $CO_2$ and $H_2$ to $H_2O$. The introduction of the air at the tuyère 46 for burning the H and CO remaining from the reduction affects the volume and constituents of the gases as indicated.

Figure 4:
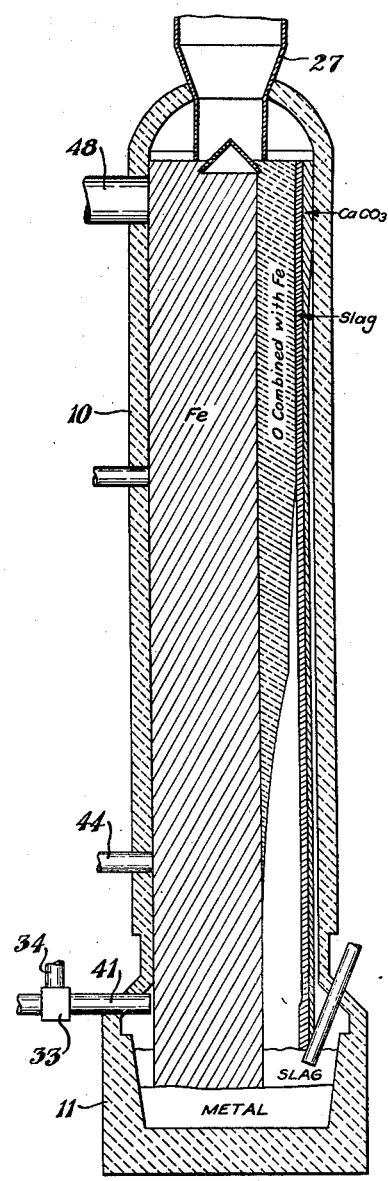

Fig. 4 is a diagram of the example cited in the specification showing the distribution of the solid materials in the furnace according to weight, and indicates the changes occurring in the charge during the operation.

Figure 5:
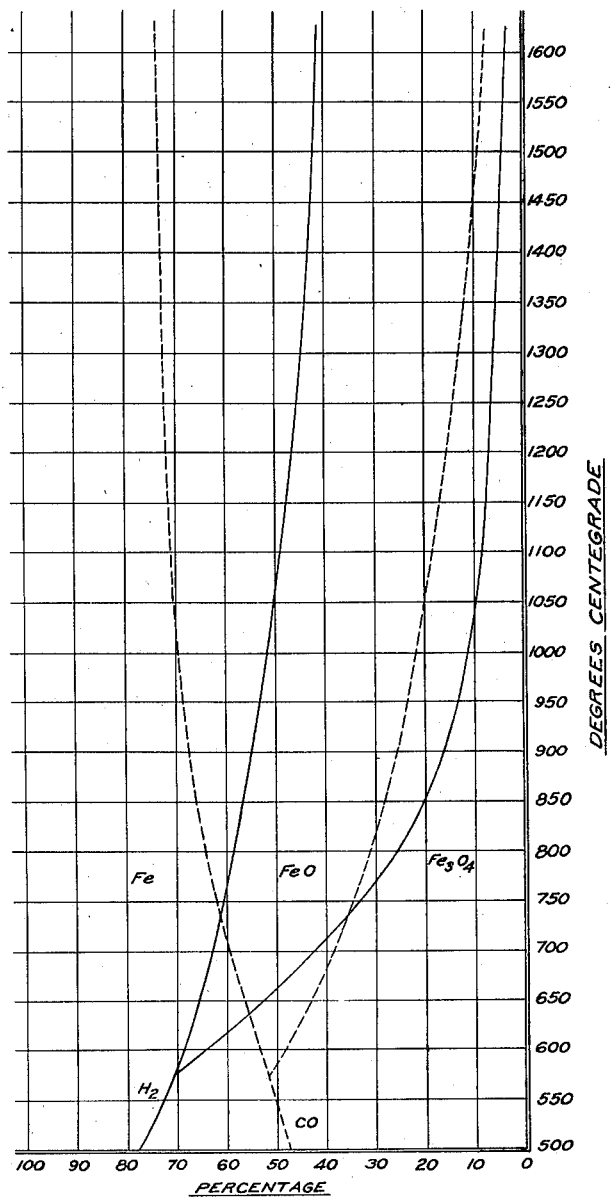

Fig. 5, a reduction equilibria curve showing the percentages of CO and H required for the reduction of FeO to Fe and for the reduction of $Fe_3O_4$ to FeO.

Similar numerals refer to similar parts throughout the drawings.

The improved process for reducing ores or oxides containing iron may be carried out in an apparatus such as illustrated in the drawings, which includes a furnace in which the reduction and melting process is carried out, said furnace comprising the shaft section 10 which may be supported independently of the hearth section 11 as by the beams 12 and posts 13.

The hearth section may be mounted upon rollers 14 so that it may be removed from under the shaft section without disturbing the same, a removable section 15 being preferably provided between the roof 16 of the hearth section and the lower end of the shaft.

The finely divided ore, flux and any alloy or de-oxidizing material required, may be contained in suitable bins, the lower portions of which are indicated at 17, and are arranged to be fed from the bins onto a conveyer belt 18, as by means of the adjustable constant weight feeders 19, operated by the motors 20, controlled as by the rheostats 21, whereby the operation of each constant weight feeder may be independently controlled.

The conveyer 18 discharges the material into the hopper 22 of a Fuller-Kinyon pump 23 which may be driven as by the motor 24 controlled as by the rheostat 25. This finely divided material of the charge is conveyed from the pump through the pipe 26 to the feeding head 27, which may be of the dust collector type, located at the top of shaft 10. Air from the pipe 26 may be exhausted through the exhaust outlet 28 or may be allowed to pass into the top of the furnace shaft and thence to the waste gas outlet 29.

In carrying out the process any suitable carbonaceous fuel, either solid or in the form of hydrocarbon oil or hydrocarbon gas, may be used. The preferable fuel is bituminous coal and the same may be pulverized in the mill 30 and transported by the blast from the fan 31 through the duct 32 to the mixer 33, where it is mixed with preheated air from the hot blast pipe 34 leading from the recuperator 35. The fan 31 may be driven by a motor 36 controlled as by the rheostat 37, and the fan 38 which supplies the blast for the recuperator 35 may be driven by a motor 39 controlled as by the rheostat 40.

The mixture of powdered fuel and preheated air is discharged from the burner pipe 41 into the combustion zone 42 at the lower end of the shaft, where it is burned producing a temperature of about 1600° C. As insufficient air for complete combustion is provided, a highly reducing gas is produced by this incomplete combustion, the gas burning to CO, H, N and S, and in some cases a small amount of $CO_2$, and ascending into the final reduction zone 43. At a point in this final reduction zone, additional fuel may be admitted through the pipe 44 to make this zone more strongly reducing. The gas in the final reduction zone may thus be kept substantially free from $CO_2$ and $H_2O$, even though some reduction of the oxide may take place in this section and some $CO_2$ be formed by the combustion of the fuel, the auxiliary fuel introduced through the pipe 44 immediately converting any $CO_2$ and $H_2O$ formed into CO and H.

It will, of course, be understood that the finely divided material of the charge is constantly descending through the shaft from the upper end thereof, the hot products of combustion from the fuel passing upward counter thereto. In this final reduction zone, the FeO of the descending charge is reduced to Fe. As the hot gases ascend to the preliminary reduction zone indicated at 45, the $Fe_3O_4$ of the charge is reduced to FeO, and the $Fe_2O_3$ to $Fe_3O_4$. At the upper end of this preliminary reduction zone, additional air may be supplied from the blast pipe 46, burning any unburned gases to $CO_2$ and $H_2O$ as they pass upward through the preheating zone indicated at 47. Any sulphur in the ore is burned to $SO_2$ or $SO_3$ in this zone, and any carbonates present are decomposed, the gaseous products from such reactions passing upwards with the other waste gases.

The waste gases, after ascending through the preheating zone, are discharged through the waste gas outlet 29 and through duct 48 to the recuperator 35 and then to the waste heat boiler 49 and through the exhaust fan 50 and stack 51 to the atmosphere. The motor 52 which drives the fan 50 may be controlled as by the rheostat 53.

It may be well to note here that the reduction of $Fe_2O_3$ with CO to produce 2240 pounds of iron takes place according to the following equation:

(1)
$$\underset{Fe_2O_3}{3200 \text{ lbs.}} \text{ plus } \underset{3 \text{ CO}}{1680 \text{ lbs.}} = \underset{2 \text{ Fe}}{2240 \text{ lbs.}} \text{ plus } \underset{3 \text{ CO}_2}{2640 \text{ lbs.}}$$

The progressive reduction takes place according to the following equations:

(2)
$$\underset{3 \text{ Fe}_2O_3}{3200 \text{ lbs.}} \text{ plus } \underset{CO}{187 \text{ lbs.}} = \underset{2 \text{ Fe}_3O_4}{3094 \text{ lbs.}} \text{ plus } \underset{CO_2}{293 \text{ lbs.}}$$

(3)
$$\underset{Fe_3O_4}{3094 \text{ lbs.}} \text{ plus } \underset{CO}{373 \text{ lbs.}} = \underset{3 \text{ FeO}}{2880 \text{ lbs.}} \text{ plus } \underset{CO_2}{587 \text{ lbs.}}$$

(4)
$$\underset{FeO}{2880 \text{ lbs.}} \text{ plus } \underset{CO}{1120 \text{ lbs.}} = \underset{Fe}{2240 \text{ lbs.}} \text{ plus } \underset{CO_2}{1760 \text{ lbs.}}$$

It is to be noted that while 1680 pounds of CO is required to reduce $Fe_2O_3$ to produce 2240 pounds of Fe, two-thirds of the total amount of CO required or 1120 pounds is required for the reduction of the FeO to Fe.

It is significant that, according to Eastman's reduction equilibria curve shown in Fig. 5, a ratio of 70% CO to 30% $CO_2$ must be maintained at 1050° C. to reduce FeO with CO. Therefore, 3733 pounds CO must be supplied in the FeO reduction zone in order that the FeO may be completely reduced, while only 1680 pounds CO is required theoretically to perform the complete reduction from $Fe_2O_3$ to Fe.

If a fuel containing hydrogen is used, the hydrogen also acts as a reducing agent, and thus lowers the amount of CO required. It will be noted from the H curve in Fig. 5 that at 1050° C. 50% of the H is available as a reducing agent.

When a typical bituminous coal analyzing

|   | Percent |
|---|---|
| C | 80.0 |
| H | 4.5 |
| O | 5.0 |
| S | .5 |
| Ash | 10.0 | is used, the hydrogen will take care of 36% of the reduction, thus reducing the amount of CO required to 2390 pounds, or 1280 pounds coal. The equation for the reduction would then be:

(5)
$$\underset{FeO}{1844 \text{ lbs.}} \text{ plus } \underset{CO}{717 \text{ lbs.}} = \underset{Fe}{1434 \text{ lbs.}} \text{ plus } \underset{CO_2}{1127 \text{ lbs.}}$$

(6)
$$\underset{FeO}{1036 \text{ lbs.}} \text{ plus } \underset{H_2}{28.8 \text{ lbs.}} = \underset{Fe}{806 \text{ lbs.}} \text{ plus } \underset{H_2O}{258.8 \text{ lbs.}}$$

It will thus be seen that theoretically hydrogen is fourteen times as strong a reducing agent as CO per unit of weight, but is actually more than twenty times as effective as CO above 1050° C. when taking the reduction equilibria data into consideration.

As shown by Fig. 5, as the temperature rises, the percentage of CO required in the gas rises slightly, and the percentage of H required drops, so these changes must be taken into consideration when operating at a higher or lower temperature.

From this data it will be seen that under given conditions the same amount of fuel will be required to reduce FeO to Fe as will be required to reduce $Fe_2O_3$ to Fe producing a given amount of iron. After the reduction of $FeO_3$ to Fe there is left 2053 pounds of CO (or its approximate equivalent in CO and H) which is burned with air to take care of preheating the charge and calcining the limestone in the preheating section of the shaft. The amount of heat available for this purpose will be ample to take care of even very lean ores under these conditions.

I have found that in the presence of carbon in an atmosphere of CO gas at a temperature above 1400° C. phosphorus in the form of calcium phosphate is reduced to elemental phosphorus. Therefore, since practically all commercial iron ores contain phosphorus, I prefer to introduce carbonaceous fuel without air near the bottom of the final reduction zone 43 so that any phosphorus present in the ore may be reduced in the presence of the carbon to elemental phosphorus and pass into the furnace gases where it is oxidized to $P_2O_5$ as it ascends through the furnace shaft, and finally passes out of the furnace through duct 29. If present in sufficient quantities, phosphorus so reduced may be recovered as a by-product.

Fuel introduced in this zone without sufficient air for burning to CO, not only permits the elimination of the phosphorus which is not possible unless the gas is substantially free from $CO_2$, but enables a richer reducing gas to be maintained than can be made by burning substantially completely to CO. This is especially desirable in the reduction of rich hematite ores or magnetite ores.

A typical analysis of a magnetite ore which may be used in the process is as follows:

| | Percent |
|---|---|
| $Fe_3O_4$ | 97.874 |
| $SiO_2$ | 1.24 |
| $Al_2O_3$ | .80 |
| $MnO$ | .04 |
| $P$ | .046 |

A typical analysis of bituminous coal which may be used for fuel in carrying out the process is as follows:

| | Percent |
|---|---|
| C | 80 |
| H | 5 |
| O | 5 |
| Ash | 10 |

There is theoretically required per gross ton of iron produced, 3162 pounds ore, 204 pounds limestone, 1000 pounds coal, and 7190 pounds air, and 79 k. w. hours. In a large commercial furnace, the temperature of the combustion zone may be maintained at 1600° C. when burning 90% of the coal to CO, by preheating the air for combustion to approximately 850° C.

It will be noted that theoretically 1200 pounds of coal of the above analysis must be used to form sufficient reducing gas to reduce the FeO to produce a gross ton of iron, but if only 90% of the fuel is burned with air to form CO, and 10% is introduced without air, the necessary reduction equilibrium conditions will be maintained when reducing at 1000° C. or above. The reduction of the FeO will then take place according to the following equations:

(7)
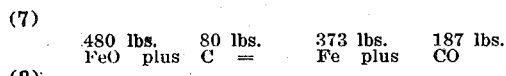

(8)
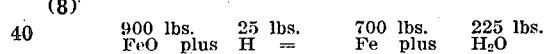

(9)
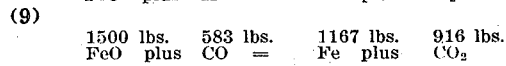

It is thus possible to substantially maintain the reduction equilibria conditions necessary for the reduction of the FeO when of the 50 pounds H in 1000 pounds of coal, 25 pounds or 50% is used, and of the 1867 pounds CO, 583 pounds, or 31% is used. There is remaining in the gas after the reduction of the $Fe_3O_4$ to FeO, 1258 pounds CO (or CO and H equivalent) which is burned with air to preheat the charge.

Fig. 2 is a diagram showing the heat distribution in this operation, and indicates where the heat is developed and how it is used. The following is a description of this diagram:

As the coal and air enter the shaft through the burner pipe 41, the coal is cold and the air is at a temperature of 844° C. The air, therefore, contains 810,029 calories sensible heat, and the coal contains 8,047,620 calories potential or latent energy, of which 7,254,470 calories are introduced in the combustion zone and 793,150 calories are introduced through the pipe 44 into the final reduction zone, making a total of 8,857,649 calories in the operation.

When the carbon is burned to CO, 1,691,280 calories are converted from latent heat to sensible heat, 1,558,080 calories of which enter the gases, 133,200 calories being disbursed for wall loss in the combustion zone, for heating the coal ash, and for reactions.

Of the 2,368,109 calories sensible heat now in the gases, 234,267 calories are required for reactions, and an additional 382,715 calories are required to heat the iron, FeO and slag, which are at a temperature of about 1200° C., at this point to 1600° C., and for wall loss in the final reduction zone 43.

There are now 1,751,127 calories sensible heat in these gases, of which 20,043 calories are required for the reduction of FeO in the lower part of reduction zone 45; and 195,777 calories are required for the upper part of zone 45 for endothermic reactions and wall loss; while there is a credit of 391,600 calories for excess sensible heat in the $Fe_3O_4$ and slag, making a total of 175,780 calories sensible heat gained in zone 45, and leaving 1,926,907 calories sensible heat in the gases.

Of the 8,047,620 calories latent heat in the gases, 1,691,280 calories have been changed to sensible heat in zone 42, leaving 6,356,340 calories latent heat in the gases. There is required for the reduction of the FeO and $Fe_3O_4$, 80 pounds of C to CO, 54 pounds H, and 551 pounds CO, which absorbs 3,100,950 calories of the latent energy present, and there is required for breaking up the moisture in the air, 24 pounds C to CO, which absorbs 58,320 calories, leaving 3,197,070 calories latent heat in the gases at the top of zone 45, which is converted into sensible heat by burning.

There are thus 5,123,977 calories sensible heat in the gases at the bottom of the preheating zone 47, of which 1,471,365 calories are used to preheat the ore and lime, break up the limestone, and for wall loss in zone 47, while 3,652,023 calories are carried out in the waste gases through pipe 48 which go to recuperator 35 to preheat the air for combustion, and leave the recuperator with 2,476,100 calories remaining in them.

The 8,857,649 calories involved in the whole operation are therefore used as follows:

| | Calories |
|---|---|
| Latent heat absorbed for reduction | 3,159,270 |
| Sensible heat used for preheating, reactions and wall loss | 2,045,767 |
| Sensible heat in gases going to recuperator | 3,652,023 |
| Total | 8,857,060 |

Of the 3,652,023 calories sensible heat in the gases going to the recuperator, 1,175,923 calories are used for preheating the air and for wall loss in recuperator, leaving 2,476,100 calories going to the waste heat boiler 49 shown in Fig. 1, in the form of about 9000 pounds of stack gas at 945° C. The heat in this gas is sufficient to produce about 155 k. w. hours when utilized in the waste heat boiler at an assumed efficiency of 70%, and an efficiency in turbine 56, condenser 63 and generator 57, of 20,000 B. t. u. per kilowatt hour.

It is thus to be noted that the heat in the waste gases after they leave the recuperator is sufficient to produce 155 k. w. hours per ton of iron produced, and that this may be used effectively in superheating the metal and slag in hearth section 11.

It will also be noted in Fig. 2 that there is considerable latent heat in the gases after all the reduction of the ore has taken place. This is necessarily so since the gases are relatively rich in carbon monoxide and hydrogen when they cease to have reducing action on the oxide, and by the introduction of air at this point, the latent heat of these partially spent gases is transformed into sensible heat and effectively used in preheating the charge to the reaction temperature.

It will thus be seen that in this operation it is not only desirable to have heat at this point for preheating the charge, but this is effected by transforming what would otherwise be waste energy into useful energy in bringing the charge up to the reaction temperature in the shaft of the furnace at a stage of the operation where an oxidizing atmosphere is permissible.

It is to be noted however, that under some conditions of operation, there will be sufficient sensible heat in the reducing gases to take care of all of the heating requirements above the reduction zone, so that no additional sensible heat need be supplied by burning with air any of these reducing gases in the upper part of the furnace. Under such conditions, these gases may be taken off at the top of the furnace at a relatively low temperature but still containing a considerable quantity of latent heat, and may be burned outside the furnace in hot blast stoves for preheating the blast, and in waste heat boilers for conversion into electric power to be used in the hearth of the furnace.

The amount of fuel which may be added without air for combustion to CO is limited by the amount of heat available in the gases from the combustion zone 42 as the reduction of FeO with C or H is endothermic while the reduction of FeO with CO is slightly exothermic.

On account of the very great reducing capacity of hydrogen in this process, it may be desired to add hydrogen in combustion zone 42 with or without the carbonaceous fuel as outlined in the above operation.

I prefer to use preheated air and/or to burn a small portion of the C to $CO_2$ in zone 42 for producing the reducing gas in order to obtain a temperature above 1400° C. so as to insure a temperature high enough in the lower part of this zone to reduce the phosphorus. This temperature will also prevent the formation of hydrocarbon gases which are not active reducing agents compared with CO and H.

There are so many factors to be taken into consideration that it is necessary to calculate a heat and chemical balance for each type of ore and fuel used and each product desired in order that the process may be operative, so I do not wish to be limited to the examples given.

In order that the reduced iron or steel may be desulphurized I charge sufficient limestone or lime with the ore to provide a slag high in CaO, or high in CaO and $Al_2O_3$, and low in $SiO_2$ as is known to be required for such desulphurizing action, and where it is desired to produce a "killed" or deoxidized steel, I charge into the slag fine carbon which at the temperature of the electrically heated slag high in lime, forms a "carbide" slag which deoxidizes as well as desulphurizes the reduced metal as it passes through it to the metal bath below. Another practice which may be followed is the addition of ferro-alloys for deoxidizing the metal, or for desired alloy additions.

In the production of ferrous alloys or ferroalloys from an oxid of iron and an oxide of the alloying element, the oxide of iron and the oxide of the alloying element in a finely divided condition, are charged into the furnace with sufficient carbon in a coarser form and in sufficient quantity to reduce the more refractory oxide.

The oxide of iron is reduced in the shaft of the furnace and the reduced iron together with the oxide of the alloying element and carbon for reduction descend to the electrically heated hearth where the oxide of the alloying element is reduced and combines with the reduced iron forming the desired alloy, the CO formed in the reduction of the alloying element ascending through the shaft and being utilized in reducing the iron oxide of the charge.

I have thus provided a process for progressively preheating and desulphurizing the ore and calcining the carbonates by spent reducing gases, reducing the materials progressively with the upflowing reducing gases, strengthened the reducing gases in the lower part of the shaft by introducing fuel without air, eliminated the phosphorus of the ore in the highly heated strongly reducing gases in the bottom of the shaft, melted the reduced particles of the charge before they reach the electrically heated crucible, further refined the reduced material as it passes through the desulphurizing and reducing slag, and then held the reduced metal without agitation in the electrically heated crucible under a reducing slag for degasification and elimination of slag particles.

And I have provided a process wherein refractory oxides contained in iron ore or added to the charge may be reduced in the electrically heated hearth by causing the necessary amount of carbon to fall with the ore to the electrically heated hearth, the CO gases formed by such reaction in the hearth being utilized in the reduction of the less refractory oxides in the shaft.

And, also, I have disclosed a method for recovering the sensible heat in the waste gases for preheating the charge and preheating the air, and converting the remaining heat into electricity and using it for heating in the crucible of the furnace.

I claim:

1. The process for treatment of ores containing iron which consists in continuously charging finely divided ore, and flux if required, into the top of a shaft furnace and allowing it to fall freely in counterflow to a current of heated gas, formed by the incomplete combustion of powdered coal and preheated air in the lower part of the shaft forming a gas composed substantially of CO, H and N at a temperature above 1400° C., which ascends through the shaft and reduces the iron oxide in the lower portion of the shaft, introducing additional fuel substantially without air a short distance above the combustion zone to enrich the reducing gas, collecting the reduced metal and slag forming constituents in the hearth portion of the furnace, admitting air above the reduction zone for preheating the charge, and removing the gases at the top of the shaft.

2. The process for treatment of ores containing iron which consists in continuously charging finely divided ore, and flux if required, into the top of a shaft furnace and allowing it to fall freely in counterflow to a current of heated gas, formed by the incomplete combustion of fuel and air in the lower portion of the shaft, which ascends and reduces the iron oxide in the lower portion of the shaft, collecting the reduced metal and slag forming constituents in the hearth of the furnace, admitting air above the reduction zone to burn the combustible elements remaining in the gas for preheating the charge, removing the gases at the top of the shaft and passing them through a recuperator for preheating the air for combustion, then passing the gases through a waste heat boiler to produce steam for generating electricity and using the electricity so generated for heating the hearth section of the furnace.

3. The process for treatment of ores containing iron which consists in continuously charging finely divided ore, and flux if required, into the top of a shaft furnace and allowing it to fall freely in counterflow to a current of heated gas which ascends and reduces the iron oxide in the lower portion of the shaft, collecting the reduced metal and slag forming constituents in the hearth of the furnace, admitting air above the reduction zone to burn the combustible elements remaining in the gas for preheating the charge, removing the gases at the top of the shaft and passing them through a waste heat boiler to produce steam for generating electricity and using the electricity so generated for heating the hearth section of the furnace.

4. That process for the treatment of ores containing iron which consists in charging finely divided ore at the top of a furnace shaft, allowing it to fall freely through the shaft of the furnace in counterflow to a current of heated gas which ascends through the shaft and reduces the iron oxide in the lower portion of the shaft, collecting the reduced metal and slag forming constituents in the hearth portion of the furnace, passing the products through a deep bath of desulphurizing and de-oxidizing slag maintained at the desired temperature by means of electric heat and admitting air above the reduction zone for preheating the charge, and removing the gases at the top of the shaft.

5. That process for the treatment of ores containing iron which consists in charging finely divided ore at the top of a furnace shaft, allowing it to fall freely through the shaft of the furnace in counterflow to a current of heated gas which ascends through the shaft and reduces the iron oxide in the lower portion of the shaft, collecting the reduced metal and slag forming constituents in the hearth portion of the furnace, adding de-oxidizing agents in the form of ferro alloys or calcium carbide to the melted metal, and removing the gases at the top of the shaft.

6. That process for the treatment of ores containing iron and phosphorus which consists in charging finely divided ore at the top of a furnace shaft, allowing it to fall freely through the shaft of the furnace in counterflow to a current of heated gas formed by the incomplete combustion of powdered coal and preheated air in the lower part of the shaft forming a gas composed substantially of CO, H and N at a temperature above 1400° C. which ascends through the shaft and reduces the iron oxide and phosphorus oxide in the lower portion of the shaft, collecting the reduced metal and slag forming constituents in the hearth portion of the furnace, and removing the gases containing the phosphorus at the top of the shaft.

7. That process for the treatment of ores containing iron which consists in charging finely divided ore at the top of a furnace shaft, allowing it to fall freely through the shaft of the furnace in counterflow to a current of heated gas formed by the incomplete combustion of powdered coal and preheated air in the lower part of the shaft, forming a gas composed substantially of CO, H and N at a temperature above 1400° C. which is enriched by the introduction of fuel substantially without air in the FeO reduction zone and maintained at a temperature and composition sufficient to reduce substantially all the FeO to iron in the lower portion of the shaft, collecting the reduced metal and slag forming constituents in the hearth portion of the furnace, and removing the gases at the top of the shaft.

8. That process for the treatment of ores containing iron and phosphorus which consists in charging finely divided ore at the top of a furnace shaft, allowing it to fall freely through the shaft of the furnace in counterflow to a current of heated gas which is enriched by the introduction of fuel without air in the FeO reduction zone and maintained at a temperature above 1400° C. and composition substantially free from $CO_2$ and $H_2O$ in the lower portion of the shaft, collecting the reduced metal and slag forming constituents in the hearth portion of the furnace, and removing the gases containing substantially all of the phosphorus at the top of the shaft.

9. That method of producing ferrous alloys from oxides of iron and oxides of the alloying elements which consists in charging finely ground iron oxide and the oxide of the alloying element to be reduced to form the alloy in the top of a shaft type furnace together with the necessary carbon to reduce the oxide of the alloying element, preheating the charge by the waste gas of the reduction operation in the top of the shaft, reducing the iron oxide while descending through the upgoing gases, and reducing the oxide of the alloying element with carbon in the hearth of the furnace with electric heat, utilizing the CO gas formed by the reduction of the alloying element in the hearth for reducing the iron oxide in the shaft while falling through the shaft, and collecting the reduced iron and reduced alloy in the bottom of the furnace hearth.

10. That method of producing ferrous alloys from oxides of iron and oxides of the alloying elements, one of the oxides containing phosphorus as a phosphate which consists in charging finely ground iron oxide, and the oxide of the alloying element to be reduced to form the alloy, in the top of a shaft type furnace together with the necessary carbon to reduce the oxide of the alloying element, preheating the charge in the top of the shaft by the waste gas of the reduction operation, passing the charge through a CO reducing gas substantially free from $CO_2$ at a temperature above 1400° C. for the reduction, volatilization and removal of the phosphorus with the upgoing gases, reducing the iron oxides while falling through the upgoing gases, and reducing the oxide of the alloying element with carbon in the hearth of the furnace with electric heat, utilizing the CO gas formed by the reduction of the alloying element in the hearth for reducing the iron oxide in the shaft while falling through the shaft, and collecting the reduced iron and reduced alloy at the bottom of the furnace hearth.

11. That method in the production of steel from finely divided iron ore containing sulphur, and phosphorus in the form of phosphate, which consists in feeding finely divided ore and limestone in the top of a shaft type furnace allowing it to fall freely down the shaft counterflow to reducing gases introduced at the bottom of the shaft, oxidizing the sulphur of the charge in the upper part of the shaft, decomposing the limestone in the upper part of the shaft, progressively reducing the iron oxide at a temperature above 1000° C., then reducing the phosphate to volatile phosphorus at a temperature above 1400° C., passing the reduced iron through a deep bath of high calcium reducing slag for elimination of sulphur coming from the fuel, and holding the reduced metal under the slag bath in an unagitated condition before tapping.

12. That method of reducing iron ore in a shaft type furnace which consists in charging finely divided ore and limestone into the top of the furnace, passing it downward counterflow to a current of reducing gas made from powdered coal and preheated air introduced at the bottom of the shaft, burning the spent gases of the reduction operation with air in the top portion of the furnace for preheating the charge, and decomposition of the limestone, utilizing the heat of these gases after they leave the top of the furnace for preheating the air for primary combustion to CO and H to such temperature as will produce a temperature in the combustion zone high enough to decompose any hydrocarbon formed in this zone, maintaining a gas non-oxidizing to iron in the primary combustion zone, and of sufficient temperature to melt the reduced iron before it falls into the crucible of the furnace and utilizing the heat in the waste gas after preheating the air to the desired temperature, for the production of power, and utilizing it for heating the crucible of the furnace.

13. The process for treatment of ores containing iron which consists in continuously charging finely divided ore, and flux if required, into the top of a shaft furnace and allowing it to fall freely in counterflow to a current of heated gas, formed by the incomplete combustion of fuel and air in the lower portion of the shaft, which ascends and reduces the iron oxide in the lower portion of the shaft, collecting the reduced metal and slag forming constituents in the hearth of the furnace, removing the gases at the top of the shaft, utilizing the heat in the gases for preheating the air for combustion, and for generating electricity and using the electricity so generated for heating the hearth section of the furnace.

14. The process for the treatment of ores containing iron which consists in continuously charging finely divided ore, and flux if required, into the top of a shaft furnace and allowing it to fall freely in counterflow to a current of heated gas which ascends and reduces the iron oxide in the lower portion of the shaft, collecting the reduced metal and slag forming constituents in the hearth of the furnace, removing the gases at the top of the furnace shaft, and passing them to a waste heat boiler for producing steam for generating electricity and using the electricity so generated for heating the hearth section of the furnace.

15. That process for the treatment of ores containing iron which consists in charging finely divided ore at the top of a furnace shaft, allowing it to fall freely through the shaft of the furnace in counterflow to a current of heated gas which ascends through the shaft and reduces the iron oxide in the lower portion of the shaft, collecting the reduced metal and slag forming constituents in the hearth portion of the furnace, passing the products through a deep bath of electrically heated desulphurizing slag, and removing the gases at the top of the furnace.

16. That method of treating ores containing iron and phosphorus as a phosphate, which consists in charging the finely ground oxide in the top of a shaft type furnace, preheating the charge in the top of the shaft by the waste gas of the reduction operation, maintaining the lower portion of the shaft at a temperature above 1400° C. and in an atmosphere substantially free of $CO_2$ for the reduction, volatilization and removal of the phosphorus with the upgoing gases, reducing the iron oxide while falling through the upgoing gases, and collecting the iron in the hearth of the furnace.

17. That method in the production of iron or steel from finely divided iron ore containing phosphorus in the form of phosphate by means of a reducing gas formed by the incomplete combustion of fuel containing sulphur which consists in feeding finely divided ore and limestone in the top of a shaft type furnace, allowing it to fall freely down the shaft in counterflow to the reducing gases formed at the bottom of the shaft, decomposing the limestone in the upper part of the shaft, progressively reducing the iron oxide at a temperature above 1000° C., reducing the phosphate to volatile phosphorus at a temperature above 1400° C. in a furnace atmosphere substantially free of $CO_2$ removing the volatilized phosphorus with the other gases at the top of the furnace, and passing the reduced iron through a bath of high calcium slag for the elimination of the sulphur coming from the fuel.

18. That process for the treatment of ores containing iron which consists in charging finely divided ore at the top of a furnace shaft, allowing it to fall freely through the shaft of the furnace in counterflow to a current of heated gas which ascends through the shaft and reduces the iron oxide in the lower portion of the shaft, collecting the reduced metal and slag forming constituents in the hearth portion of the furnace, passing the products through a deep bath of desulphurizing and deoxidizing slag maintained at the desired temperature by means of electric heat and removing the gases at the top of the shaft.

19. That process for the treatment of ores containing iron which consists in charging finely divided ore and finely divided limestone at the top of a furnace shaft, allowing it to fall freely through the shaft of the furnace in counterflow to a current of heated gas which ascends through the shaft and reduces the iron oxide in the lower portion of the shaft and decomposes the limestone in the upper portion of the shaft, collecting the reduced metal and slag forming constituents in the hearth portion of the furnace, maintaining a bath of the slag thus formed at the desired temperature by means of electric heat, passing the reduced iron through said slag bath and removing the gases at the top of the shaft.

THADDEUS F. BAILY.